US008240393B2

(12) United States Patent
Schmehl

(10) Patent No.: US 8,240,393 B2
(45) Date of Patent: Aug. 14, 2012

(54) ELECTRIC POWER TOOL

(75) Inventor: Florian Schmehl, Renchen-Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/820,693

(22) Filed: Jun. 22, 2010

(65) Prior Publication Data

US 2010/0319944 A1 Dec. 23, 2010

(30) Foreign Application Priority Data

Jun. 23, 2009 (DE) ......................... 10 2009 027 111

(51) Int. Cl.
*B23B 45/02* (2006.01)

(52) U.S. Cl. ............................... 173/18; 173/170; 173/2

(58) Field of Classification Search .................. 173/176, 173/179; 388/839, 840; 73/1.15, 488, 1, 73/15
See application file for complete search history.

(56) References Cited

U.S. PATENT DOCUMENTS

| | | | | | |
|---|---|---|---|---|---|
| 3,327,196 | A | * | 6/1967 | Sahrbacker | 388/830 |
| 3,456,230 | A | * | 7/1969 | Matthews et al. | 338/200 |
| 3,543,120 | A | * | 11/1970 | Robertson | 388/840 |
| 3,721,879 | A | * | 3/1973 | Corey et al. | 388/830 |
| 3,739,126 | A | * | 6/1973 | Sahrbacker et al. | 200/548 |
| 4,241,298 | A | * | 12/1980 | Trammell et al. | 318/17 |
| 4,506,198 | A | * | 3/1985 | Savas | 388/838 |
| 4,572,997 | A | * | 2/1986 | Yamanobe et al. | 388/840 |
| 4,665,290 | A | * | 5/1987 | Piber | 200/303 |
| 4,719,395 | A | * | 1/1988 | Aoi et al. | 388/840 |
| 4,737,661 | A | * | 4/1988 | Lessig et al. | 307/140 |
| 4,888,997 | A | * | 12/1989 | Eckert et al. | 73/862.382 |
| 4,903,318 | A | * | 2/1990 | Nagata | 388/840 |
| 5,002,135 | A | * | 3/1991 | Pellenc | 173/170 |
| 5,014,793 | A | * | 5/1991 | Germanton et al. | 173/181 |
| 5,075,604 | A | * | 12/1991 | Crook et al. | 318/17 |
| 5,207,697 | A | * | 5/1993 | Carusillo et al. | 606/167 |
| 5,289,047 | A | * | 2/1994 | Broghammer | 307/125 |
| 5,365,155 | A | | 11/1994 | Zimmermann | |
| 5,380,971 | A | * | 1/1995 | Bittel et al. | 200/536 |
| 5,581,165 | A | * | 12/1996 | Laio | 318/261 |
| 5,892,885 | A | * | 4/1999 | Smith et al. | 388/809 |
| 6,275,138 | B1 | * | 8/2001 | Maeda | 338/47 |
| 7,055,622 | B2 | * | 6/2006 | Bone | 173/217 |
| 7,326,869 | B2 | * | 2/2008 | Flynn et al. | 200/341 |
| 7,511,240 | B2 | * | 3/2009 | Inagaki et al. | 200/522 |
| 7,861,796 | B2 | * | 1/2011 | DeCicco et al. | 173/1 |
| 2003/0141765 | A1 | | 7/2003 | Chu | |
| 2006/0037766 | A1 | | 2/2006 | Gass et al. | |
| 2006/0107578 | A1 | * | 5/2006 | Danner et al. | 42/69.02 |

FOREIGN PATENT DOCUMENTS

| | | | | |
|---|---|---|---|---|
| DE | 4228307 | A1 | * | 3/1994 |
| DE | 19510365 | A1 | | 3/1996 |
| WO | 0105559 | A2 | | 1/2001 |
| WO | 0154869 | A1 | | 8/2001 |

* cited by examiner

*Primary Examiner* — Lindsay Low

(57) ABSTRACT

An electric power tool has an electric drive motor whose speed is adjusted by means of an adjusting device. The adjusting device includes an adjusting element movably supported on the housing of the power tool. The adjusting element is associated with a strain measuring device that produces a measurement signal that is used to adjust the drive motor in response to a movement of the adjusting element.

14 Claims, 2 Drawing Sheets

ELECTRIC POWER TOOL

CROSS-REFERENCE TO RELATED APPLICATION

This application is based on German Patent Application 10 2009 027 111.2 filed Jun. 23, 2009.

BACKGROUND OF THE INVENTION

1. Field of the Invention

The invention relates to an electric power tool, in particular a hand-held power tool.

2. Description of the Prior Art

DE 103 09 057 A1 has disclosed a cordless screwdriver that has a housing containing an electric drive motor for driving a tool holder, with a battery pack that is contained in a grip housing and is provided to supply electrical energy to the drive motor. The screwdriver is actuated by means of a push button that is supported in the grip housing in a linearly movable fashion and can be adjusted with infinite variability by the user in order to drive the tool. The speed of the drive motor is adjusted via the actuation distance of the push button.

Usually, the position of the push button is determined by means of a variable electrical resistance that has a sliding contact along the path of the push button, with the voltage signal produced being proportional to the actuation distance of the push button. To implement the actuation distance determination, it is necessary to maintain a minimum amount of installation space in the housing of the cordless screwdriver.

OBJECT AND SUMMARY OF THE INVENTION

The object of the invention is to create a small adjusting device for regulating the motor speed in an electric power tool. The adjusting device should also be embodied in a rugged way.

The invention can be used in power tools that are provided with an electric drive motor. In particular, these include hand-held electric power tools such as cordless screwdrivers and drills, angle grinders, or the like.

The electric power tool is provided with an adjusting device for regulating the motor speed; the adjusting device includes an adjusting element movably supported on the housing of the power tool. When the adjusting element is actuated, this shifts its relative position in relation to the housing, resulting in a change in the speed of the electric drive motor. The preferably infinitely variable movement of the adjusting element is converted into an electrical signal for acting on the electric motor to produce the desired speed.

To obtain a signal that reflects the movement of the adjusting element in relation to the housing, the adjusting element is associated with a strain measuring device that produces a measurement signal when the adjusting element is moved. This measurement signal is preferably converted by motor electronics into an actuation signal that results in the corresponding adjustment to the speed of the drive motor.

The power tool according to the invention, equipped with the novel adjusting element for regulating the speed of the drive motor, is based on the principle of strain sensors or strain gauges in that the actuating movement of the adjusting element causes a component of the associated strain measuring device to stretch, which can be detected by sensor. This approach has the advantage that by contrast with embodiments from the prior art, the actuating movement of the adjusting element occurs in a virtually frictionless fashion, which is accompanied by a lower susceptibility to malfunctions and soiling. Another advantage lies in the fact that a small device can be implemented since the strain measuring device, which uses standard components, can be embodied in the form of a small unit.

Basically, different actuating motions of the adjusting element can be provided. These include a translatory or linear motion, a rotary or rotating motion, or a combination of rotary and translatory motion. For example, the adjusting element of the adjusting device is embodied in the form of a push button that is secured to the housing of the power tool and guided in a linearly movable fashion. The strain measuring device can detect this linear actuating motion in order to produce a corresponding signal. The strain measuring device can also detect an actuating motion in the form of a rotating motion. To implement the rotating motion, the adjusting element is either supported on the housing in a rotary fashion or is guided so that it can move in a curved path in the housing.

According to another suitable embodiment, the strain measuring device is affixed to the housing and the movement of the adjusting element acts on the strain measuring device, thereby generating the desired signal. Basically, however, it is also possible for the strain measuring device to be situated in or on the adjusting element, with the measurement signal being produced when the strain measuring device is acted on with the aid of a component affixed to the housing.

According to another advantageous embodiment, in addition to the adjusting element, the adjusting device includes a switch housing, which is affixed to the tool housing, and the adjusting element is movably guided in the switch housing. If the adjusting element is embodied in the form of a linearly movable push button, it is secured so that it is able to move in translatory fashion in guide tracks on the switch housing. The switch housing encloses an interior in which additional components can be accommodated, in particular the strain measuring device, but also optionally other components such as electronic components of the motor electronics.

According to an advantageous embodiment, the strain measuring device includes a flexible component that is acted on by the adjusting element or, in the case in which the flexible component is situated on the adjusting element, is acted on by a component affixed to the tool housing when the adjusting element is moved. The flexible component is embodied, for example, in the form of a bending spring that is preferably clamped in place at one end and is elastically deformed transversely to its longitudinal axis when the adjusting element is moved out of its starting position. This elastic deformation is detected with the aid of a strain sensor situated on the flexible component. The signal of the strain sensor can be supplied to the motor electronics in order to produce actuating signals that are used to regulate the speed of the electric motor.

BRIEF DESCRIPTION OF THE DRAWINGS

The invention will be better understood and further objects and advantages thereof will become more apparent from the ensuing detailed description of preferred embodiments taken in conjunction with the drawings, in which.

DESCRIPTION OF THE PREFERRED EMBODIMENTS

Figure 1:
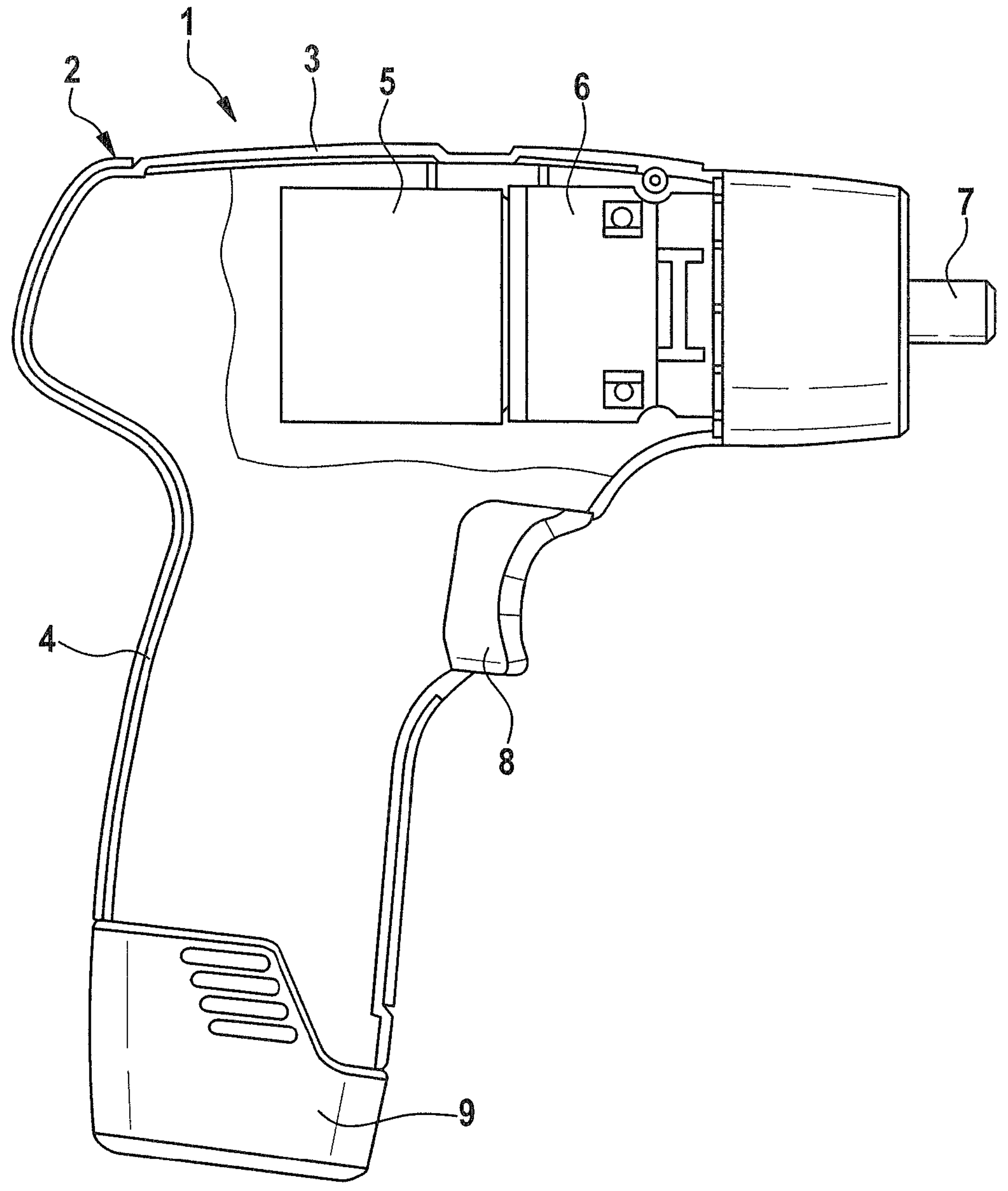
FIG. 1 shows a hand-held electric power tool embodied in the form of a cordless screwdriver or drill, equipped with a push button on the housing for adjusting the motor speed.

Components that are the same are provided with the same reference numerals in the drawings.

The hand-held electric power tool 1 shown in FIG. 1 is a cordless screwdriver or drill. The hand-held electric power tool 1 has a housing 2 that includes a motor housing 3 and a grip housing 4. The motor housing 3 contains an electric drive motor 5 whose drive motion is transmitted via a transmission 6 to a rotary-supported tool holder 7 for holding a tool. The electric drive motor 5 is actuated by means of a push button 8 that is situated in a linearly movable fashion on the grip housing 4. The lower region of the grip housing 4 accommodates a battery pack 9 that supplies the electric drive motor 5 with electrical energy. The speed of the electric drive motor 5 is regulated by actuating the push button 8, which is a component of an adjusting device. The movement of the push button 8 relative to the housing 4 constitutes a measure for the speed of the electric motor 5.

Figure 2:
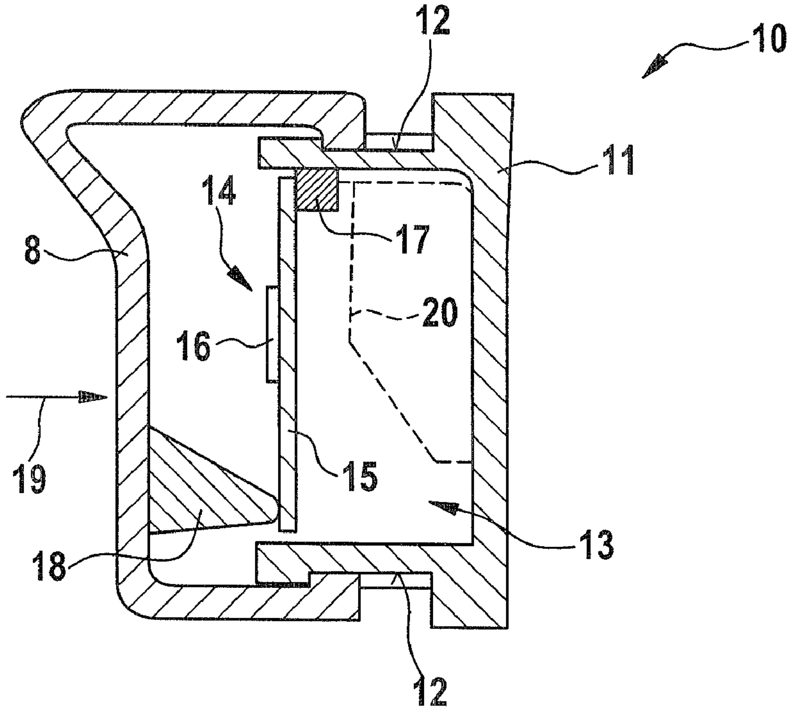
FIG. 2 is a section through a motor speed adjusting device, which includes the push button, depicted in the starting position of the push button.
Figure 3:
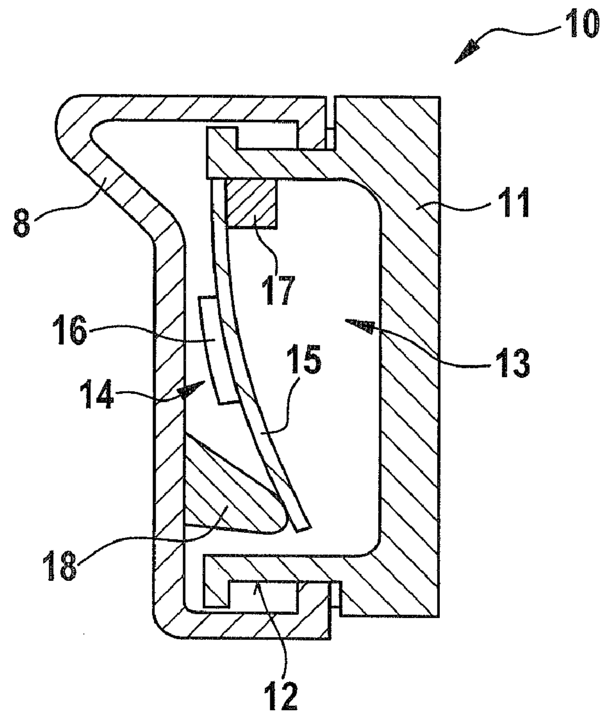
FIG. 3 is a depiction corresponding to the one in FIG. 2, but with the push button in an actuated position.

In detailed depictions, FIGS. 2 and 3 each show an example of a possible embodiment variant of an adjusting device 10 that includes the push button 8 as an adjusting element and a switch housing 11 that is affixed to the tool housing. The relative movement of the push button 8 in relation to the switch housing 11 is detected by sensor and is converted by motor electronics into an actuation signal for adjusting the electric drive motor.

The switch housing 11 has a U-shaped cross section and on the outside, is provided with lateral legs with guide surfaces 12; respective sections of the push button 8 rest against these guide surfaces and are guided along them in sliding fashion. For example, the guide surfaces 12 are embodied in the form of guide grooves. The sections of the push button 8 resting against the guide surfaces 12 are embodied in the form of hook-shaped sections bent laterally in relation to the movement direction.

In an alternative embodiment, the guide surfaces 12 on the switch housing 11 are not embodied on the outside, but rather on the inside. In this case, the hook-shaped sections on the push button 8, which rest against the guide surfaces 12 and are guided along them, are bent outward in order to produce the contact with the guide surfaces.

The switch housing 11 encloses an interior 13 in which a strain measuring device 14 is accommodated. The strain measuring device 14 includes a flexible element embodied in the form of a bending spring 15 as well as a strain sensor 16, which is positioned on the bending spring 15 and is capable of measuring a flexion of the bending spring transverse to its longitudinal axis. One end of the bending spring 15 is clamped to the switch housing 11 with the aid of a fastening element 17. The fastening element 17 attaches the bending spring 15 to the inner wall of a lateral leg of the switch housing 11. The opposite end of the bending spring 15, by contrast, is not clamped, but can elastically flex in the direction of the actuating motion of the push button 8 when placed under stress.

On the inside oriented toward the bending spring 15, the push button 8 is provided with a rib 18 that contacts the elastic bending spring 15 in the region of its free end. When the push button 8 is moved in the actuating direction 19 in a linear, translatory fashion, the rib 18 of the push button presses against the free end of the bending spring 15 and moves the bending spring into the interior 13 of the switch housing 11. FIG. 3 shows the elastically bent bending spring 15.

The interior 13 of the switch housing 11 can accommodate an electronic component 20 that is in particular a component of a set of motor electronics for adjusting the electric drive motor. Preferably, the measurement signals of the strain sensor 16 are evaluated in the electronic component 20.

The flexion of the bending spring 15, which is situated in a straight line in the switch housing 11 in the unstressed state shown in FIG. 2 and extends orthogonal to the actuating direction 19, is determined with the aid of the strain sensor 16. The flexion of the bending spring 15 constitutes a measure for the translatory, linear motion of the push button 8 in the direction toward the switch housing 11. The relationship between the translatory motion of the push button 8 and the flexion of the bending spring 15 can optionally be stored in memory in the electronic component 20. An actuating signal for regulating the motor speed can also be produced directly from the flexion of the bending spring 15.

The foregoing relates to preferred exemplary embodiments of the invention, it being understood that other variants and embodiments thereof are possible within the spirit and scope of the invention, the latter being defined by the appended claims.

I claim:

1. An electric power tool, in particular a hand-held electric power tool, having a tool housing and an electric drive motor whose speed is adjustable by means of an adjusting device, the adjusting device including a switch housing affixed to the tool housing and an adjusting element movably supported on the switch housing, a movement of the adjusting element in an actuating direction causing a change in the speed of the drive motor, wherein the adjusting element is associated with a strain measuring device that produces a measurement signal that is used to adjust the drive motor in response to a movement of the adjusting element, wherein the switch housing has an interior in which the strain measuring device is accommodated, wherein the strain measuring device includes a flexible element embodied in the form of an elongated bending spring which is accommodated within the interior of the switch housing and extends in a straight line in an unstressed state orthogonal to the actuating direction of the adjusting element, the spring having one end attached to an inner wall surface of the switch housing and an opposite free end, wherein the adjusting element is embodied in the form of a linearly movable push button secured to the switch housing via guide surfaces embodied in the form of guide grooves provided on an outside surface of the switch housing so that the push button is movable in translatory fashion, and wherein the push button has sections embodied in the form of hook-shaped sections bent laterally inward toward the guide grooves, the hook-shaped sections extending into the guide grooves and resting against the guide surfaces.

2. The power tool as recited in claim 1, wherein the actuating movement of the adjusting element is a linear motion.

3. The power tool as recited in claim 1, wherein the interior of the switch housing accommodates electronic components.

4. The power tool as recited in claim 2, wherein the interior of the switch housing accommodates electronic components.

5. The power tool as recited in claim 1, wherein the bending spring is acted on by a rib situated on the an inside wall surface of the adjusting element.

6. The power tool as recited in claim 1, wherein a strain sensor is situated on the flexible bending spring.

7. The power tool as recited in claim 2, wherein a strain sensor is situated on the flexible bending spring.

8. An adjusting device in a power tool as recited in claim 1.

9. The power tool as recited in claim 1, wherein relative movement of the push button in relation to the switch housing is detected by a sensor and converted by motor electronics into an actuation signal for adjusting the electric drive motor.

10. The power tool as recited in claim 2, wherein the flexible bending spring has a longitudinal axis and is elastically deformed transversely to its longitudinal axis when the adjusting element is moved linearly out of a starting position.

11. The power tool as recited in claim 10, wherein a strain sensor measures flexion of the flexible bending spring transverse to its longitudinal axis.

12. The power tool as recited in claim 5, wherein the rib contacts the flexible bending spring at its free end and upon movement of the adjusting element in the actuating direction presses against the free end of the flexible bending spring and moves the free end of flexible bending spring into the interior of the switch housing.

13. The power tool as recited in claim 11, wherein the strain sensor for determining flexion of the flexible bending spring is situated on the flexible bending spring.

14. An electric power tool, in particular a hand-held electric power tool, having a tool housing and an electric drive motor whose speed is adjustable by means of an adjusting device, the adjusting device including a switch housing affixed to the tool housing and an adjusting element movably supported on the switch housing, a linear movement of the adjusting element in an actuating direction causing a change in the speed of the drive motor, wherein the adjusting element has a hollow interior and a rib on an inside wall surface of the adjusting element, the rib being situated within the hollow interior of the adjusting element, wherein the switch housing has an hollow interior, wherein a strain measuring device embodied in the form of a bending spring which produces a measurement signal that is used to adjust the drive motor in response to a movement of the adjusting element is accommodated within the hollow interior of the switch housing, wherein the switch housing is at least partly accommodated within the hollow interior of the adjusting element such that the strain measuring device is situated within the hollow interior of the adjusting device, and wherein the bending spring is acted on by the rib situated on the inside wall surface of the adjusting element.

* * * * *